May 2, 1967 E. SCHICKLE 3,317,025
AUTOMATIC KEG FEEDER
Filed May 17, 1965 2 Sheets-Sheet 1

INVENTOR.
ERNST SCHICKLE
BY
ATTORNEY

May 2, 1967 E. SCHICKLE 3,317,025
AUTOMATIC KEG FEEDER
Filed May 17, 1965 2 Sheets-Sheet 2

INVENTOR.
ERNST SCHICKLE
BY
ATTORNEY

United States Patent Office 3,317,025
Patented May 2, 1967

3,317,025
AUTOMATIC KEG FEEDER
Ernst Schickle, Tappan, N.Y., assignor to Rheingold Breweries, Inc., Brooklyn, N.Y., a corporation of New York
Filed May 17, 1965, Ser. No. 456,187
4 Claims. (Cl. 198—26)

This invention relates generally to brewery operation and particularly to an improved apparatus for effecting transfer and controlled delivery of beer kegs or similar containers from a feeder location to an operating location.

The increasing degree of automation introduced into brewery operations in recent years has sharply emphasized the relative inefficiency and high cost character of particular operations included therewithin. One area so delineated and of particular concern is the relative inefficiency and high cost attendant the unloading of empty kegs and crates from distribution trucks. Such problems are due, at least in part, to the normally limited availability of dockage and adjacent storage facilities which necessitate both an excessive amount of time for unloading and, oftentimes, multiple handling operations, both of which increase the costs attendant thereto.

The subject invention may be briefly described as an improved beer keg transfer and delivery apparatus which includes, in its broad aspects, a keg receiving and accumulating conveyor, a keg transfer unit, a delivery conveyor and associated means for effecting controlled keg delivery in spaced relation onto the delivery conveyor.

Among the advantages of the subject invention is a permitted marked increase in efficiency in the unloading of empty kegs from distribution trucks at dockage areas and reduction in the time required for total truck unloading with material cost savings attendant thereto. Other advantages include a permitted uniform rate of keg delivery to the initial operational step attendant re-use thereof with a consequent permitted continuity of operation and reduction in storage area requirements.

The subject invention has been found to be particularly useful in effecting the transfer of empty kegs from a distribution truck to a receiving area located at a somewhat lower level than the receiving platform or dock.

It is the primary object of this invention to provide an improved apparatus for effecting the transfer and controlled delivery of kegs and the like from a first location to a second and lower location.

Another object of the subject invention is to provide apparatus for the transfer and controlled delivery of kegs which is simple, inexpensive and reliable.

A still further object is to provide apparatus for such transfer and controlled delivery which is automatic in operation and which can be readily combined with pluralities of similar units to effect a high degree of automation in distribution truck unloading operations.

In addition to the objects and advantages of the invention as stated above, other objects and advantages will become apparent from a reading of the following description of the invention as incorporated in a presently preferred embodiment thereof and from the attached drawings in which.

Figure 1:
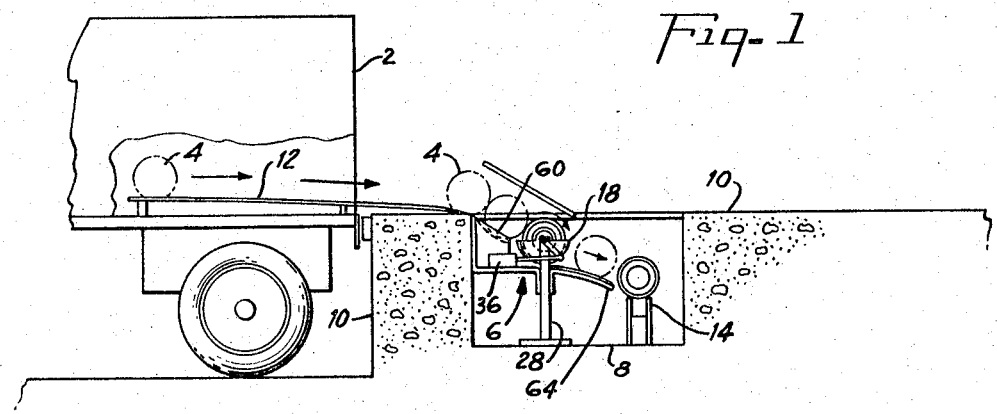
FIGURE 1 is a side elevation view, partly in section, illustrative of the utilization of the invention at an unloading dock for effecting the transfer and controlled delivery of kegs from the bed of a distribution truck to a remote receiving area.
Figure 3:
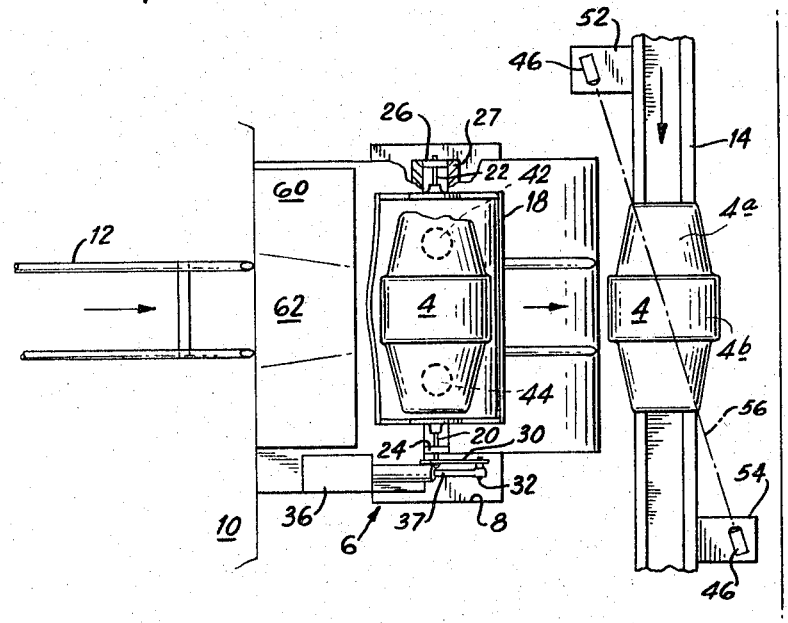
FIGURE 3 is an enlarged sectional view as taken on line 3—3 of FIGURE 2.

Referring to FIGURES 1 and 3 of the drawings, there is schematically shown a brewery distribution truck 2 backed against a loading and receiving platform or dock 10 and from which empty beer kegs 4 are to be transferred and delivered to a remote location.

Adapted to be positioned within or adjacent to the bed of the truck 2 is the terminus of an inclined feeder conveyor means 12 onto which empty kegs are manually loaded. Such feeder conveyor means 12 may be suitably formed of a pair of rails 14 and 16 which are maintained in spaced relation to cooperate with the frusto-conically shaped ends 4a and enlarged cylindrical center portion 4b of the present day conventional metal beer keg and thereby to contain and guide each keg as it rolls, under the influence of gravity, toward the transfer point. As will be apparent to those skilled in this art, other forms of feeder conveyor means 12 may be used in accordance with the dictates of particular unloading facilities and/or the types of kegs being handled. For example, a roller type conveyor or even a motorized conveyor may be used in place of the simple two rail gravity feed conveyor shown in the drawings.

The other terminus or the discharge end of the feeder conveyor means 12, which will hereinafter be generally referred to as the "feeder station," is disposed adjacent to a transfer mechanism, generally designated 6, disposed within a pit 8 in the dock 10 and which is adapted to deliver the kegs in controlled spaced relation onto a delivery conveyor 14 for transmittal to a remote location. For convenience, the location at which the kegs are introduced onto the delivery conveyor 14 will be termed a "delivery station." In accordance with applicant's invention, the transfer mechanism 6 is preferably an automatically indexing escapement type unit comprising means for receiving the lead keg from an array thereof at the feeder station and transferring such keg to the delivery station while simultaneously blocking advance of the remaining kegs in said array thereof on the feeder conveyor 12 and means for controlling operation of the transfer mechanism so as to effect keg delivery only when the delivery station is clear to accept such keg.

Figure 2:
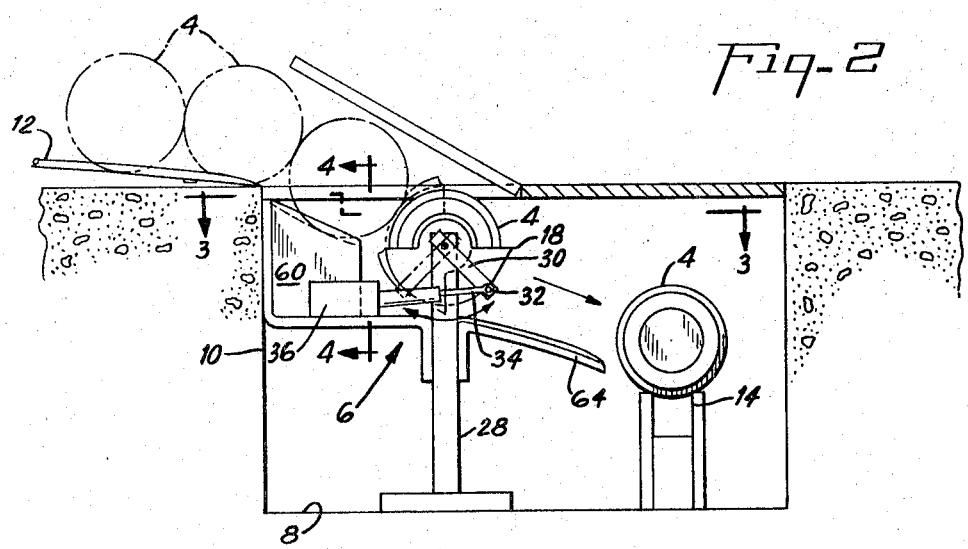
FIGURE 2 is an enlarged side elevational view of transfer mechanism shown in FIGURE 1 and indicating two index positions thereof.
Figure 4:
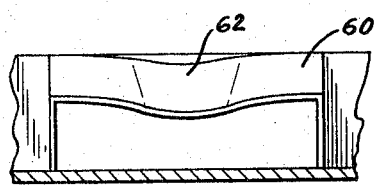
FIGURE 4 is an enlarged sectional view as taken on line 4—4 of FIGURE 2.

In the preferred embodiment of the invention and as best illustrated in FIGURES 2-4, the transfer mechanism includes a generally semi-cylindrically shaped cradle member 18 of predetermined dimension so as to relatively closely receive a keg. The cradle member 18 is rotatably mounted on pivot pins or axles 20, 22 supported, respectively, in bearings 24 and 26 and which in turn are supported by stanchions 28. As illustrated, the cradle member 18 is disposed with its longitudinal axis positioned perpendicular to the direction of keg advance and its transverse axis is disposed substantially in coaxial alignment with the center line of the feeder conveyor means 12.

Cradle member displacement from its keg receiving position, as shown in full line in FIGURE 2, to its keg discharge position, as shown in dotted line in FIGURE 2, is readily effected by means of a crank or lever arm 30. As illustrated, one end of the lever arm 30 is fixed to the end of the pivot pin 22 projecting through the bearing 26, and the other end thereof is pivotally connected, as by a pin 32, to the free end of a piston rod 34. The piston rod 34 is adapted to be lineally reciprocated by a hydraulic or air cylinder 36 of conventional construction. In the preferred embodiment, the cylinder 36 is provided with a solenoid actuated valve system and such basically includes a dump stroke valve solenoid 38 (see FIGURE 5) which, when energized, serves to effect valve actuation to move the piston rod 34 from the extended or full line position to the retracted or dotted line position as shown in FIGURE 2 and a return stroke valve solenoid 40 (see FIGURE 5) which, when energized, serves to effect valve actuation to move the piston rod 34 from the dotted line position to the full line position thereof as shown in FIGURE 2.

Figure 5:
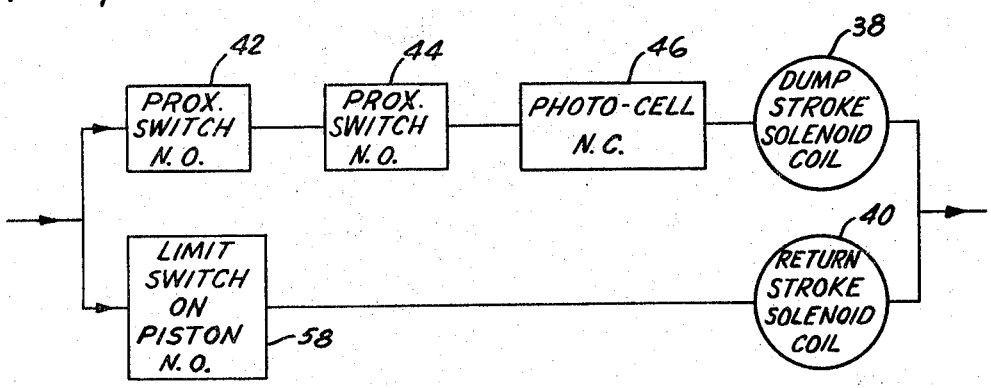
FIGURE 5 is a simplified diagrammatic sketch of a suitable electrical operating and control circuit for the subject apparatus.

Referring now to FIGURE 5, the dump stroke solenoid 38 is connected in series with two normally open proximity switches 42 and 44 and what may conveniently be termed as a normally closed photo-cell switch 46. The proximity switches 42 and 44 are suitably of the capacitive type and are conveniently mounted in spaced relation within the cradle 18 so as to be actuatably responsive to the presence of a keg in the cradle member 18 in proximity therewith to effect closure thereof. The photo cell 46 and its light source 46L are conveniently mounted on flanges 52 and 54 fixed to opposite sides of the delivery conveyor 14 to direct an interruptable beam of light, as generally indicated by dot-dash line 56, across the keg receiving area thereon.

As will now be apparent, energization of the dump stroke solenoid 38 can be effected only when the proximity switches 42 and 44 are closed, as by disposition of a keg within the cradle 18 and when there is an unobstructed keg receiving area on the delivery conveyor 14.

The control circuit also includes a return stroke control subcircuit which includes a normally open limit switch means 58 (see FIGURE 5), adapted to be closed at the limit of piston rod retraction and to remain closed until the limit of piston rod advance is reached, connected in series with the return stroke solenoid coil 38 to effect energization of the latter, when closed, to return the piston rod 34 to its original position.

Included in the "feeder station" and disposed intermediate the end of the feeder conveyor 12 and the cradle member 18 is a short inclined transfer platform 60 for supporting the lead keg as it is rolled into the cradle 18. The platform 60 is conveniently supported on the stanchions 28 and is provided with an upper surface that is preferably contoured to centrally provide a tapered depressed section 62 cooperative with the flanged central portion of the keg to aid in affirmatively maintaining the longitudinal axis of the keg parallel to the longitudinal axis of the cradle 18. As illustrated, the lip 18a of the cradle 18 is disposed in adjacent relation to the delivery end of the platform 60 is formed with a complemental depression to accommodate the bulged central portion of the keg and to aid in the smooth entry of the keg into the cradle.

A second inclined platform 64 is also supported by the stanchion 28 and serves to support and guide the keg in its delivery from the cradle member 18 to the delivery conveyor 14.

In operation of the apparatus described above, empty kegs in a distribution truck backed up against the loading dock are manually loaded onto the feed conveyor 12 and roll by gravity toward the cradle member 18, which will be assumed to be empty and in the retracted position. With the units so positioned, the lead keg will roll into the cradle and the second keg will be disposed on the platform 60 in abutting relation thereto as illustrated in FIGURE 2. The proximity switches 42 and 44 will sense the presence of a keg within the cradle and its proper positioning therein and will consequently be closed thereby. Assuming that there is no keg disposed in the delivery station area of the delivery conveyor 14 and therefore that the light beam 56 is uninterrupted, the photo cell switch 44 will remain closed and the circuit for energizing the dump stroke valve solenoid will be completed with consequent retraction of the piston rod 34. As will now also be apparent, if a keg or other obstruction in the delivery station area interrupts the light beam 54, the photo cell switch circuit will be opened thus prohibiting energization of the dump stroke solenoid 38.

The retraction of the piston rod 34, as set forth above, serves to rotatably displace the cradle 18 to the dotted line dump position as shown in FIGURE 2 wherein the contained keg will be released for gravity feed on to the delivery conveyor 14 and the proximity switches 42, 44 will revert to their normally open condition. Concurrently therewith, the displaced undersurface of cradle 18 will engage and block advance of the lead keg disposed on the transfer platform 60 and the remaining kegs disposed therebehind on the feed conveyor 12.

The keg released from the cradle 18 will roll along on platform 64 on to the delivery conveyor 14 where it will interrupt light beam 56. Substantially simultaneous with such breaking of the light beam 56 and concurrent opening of the photo cell switch 46 by the delivered keg, the limit switch 58 is actuated in response to piston rod retraction and displaced to its closed position to energize the return stroke valve solenoid coil 40 to effect advance of the piston rod 34 and return the cradle 18 to its original keg receiving position as shown in full line in FIGURE 2 and to reset the limit switch 58 to its normally open position. As the cradle 18 is returned to its original position, the interposed wall of the cradle disposed in abutting relation to the next succeeding keg is lowered, thus permitting such keg to feed into the cradle and initiate a repetition of the cycle.

Thus, while I have described and illustrated a preferred embodiment of the invention, it will be appreciated that certain changes and modifications will become apparent from reading the above specifications and drawings and it is intended in the claims to cover all such changes and modifications as fall within the true spirit and scope of the invention.

I claim:

1. Apparatus for automatically transferring beer cans from the discharge end of a first conveyor to a receiving station location on a second conveyor means comprising keg transfer means arcuately displaceable intermediate a keg receiving location adjacent the discharge end of said first conveyor and a keg delivering location adjacent the receiving station location on said second conveyor, first sensing means responsive to the presence of a keg within said keg transfer means for initiating displacement thereof from said keg receiving location to said keg delivering location and second sensing means responsive to the presence of a keg disposed within the receiving station location on said second conveyor means for preventing initiation of displacement of said keg transferring means by said first sensing means.

2. Apparatus for automatically and successively transferring the lead beer keg of a succession thereof from the discharge end of a first inclined feed conveyor to a receiving station location on a second adjacent lower conveyor comprising a cradle member arcuately displaceable intermediate a keg receiving location adjacent the discharge end of said first conveyor and a keg delivering location adjacent the receiving station location on said second conveyor, means for arcuately displacing said cradle from its keg receiving location to its keg delivering location to deliver a keg contained therein to said receiving station location and to concurrently interpose said cradle member in the path of displacement of the next succeeding keg from the discharge end of said first conveyor, first sensing means responsive to the presence of a keg within said cradle member for actuating said displacing means to initiate displacement of said cradle member from said keg receiving location to said keg delivering location and second sensing means interlocked with said first sensing means and responsive to the presence of a keg disposed within the receiving station location on said second conveyor for preventing actuation of said displacing means by said first sensing means.

3. The apparatus as set forth in claim 2 wherein said first sensing means is disposed in and is displaceable with said cradle member.

4. The apparatus as set forth in claim 2 including means supporting said cradle member relative to the discharge end of said first conveyor to permit the disposition of a keg therein at said keg receiving location to block displacement of succeeding kegs on said first conveyor.

References Cited by the Examiner
UNITED STATES PATENTS

| | | | |
|---|---|---|---|
| 2,762,487 | 9/1956 | Temple | 198—21 |
| 3,235,101 | 2/1966 | Milhoupt | 198—26 X |

EVON C. BLUNK, *Primary Examiner.*

A. C. HODGSON, *Assistant Examiner.*